(12) United States Patent
Kwon et al.

(10) Patent No.: US 10,837,655 B2
(45) Date of Patent: Nov. 17, 2020

(54) AIR CURRENT CHANGEABLE FULL FRONT BLOWING TYPE AIR CONDITIONER

(71) Applicant: SAMSUNG ELECTRONICS CO., LTD., Suwon-si (KR)

(72) Inventors: Ki-hwan Kwon, Hwaseong-si (KR); Eun-bi Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 763 days.

(21) Appl. No.: 15/506,482

(22) PCT Filed: Sep. 9, 2015

(86) PCT No.: PCT/KR2015/009471
§ 371 (c)(1),
(2) Date: Feb. 24, 2017

(87) PCT Pub. No.: WO2016/043466
PCT Pub. Date: Mar. 24, 2016

(65) Prior Publication Data
US 2017/0261215 A1  Sep. 14, 2017

(30) Foreign Application Priority Data

Sep. 15, 2014  (KR) .......................... 10-2014-0121721

(51) Int. Cl.
*F24F 1/0033* (2019.01)
*F24F 1/0018* (2019.01)
(Continued)

(52) U.S. Cl.
CPC .......... *F24F 1/0033* (2013.01); *F24F 1/0018* (2013.01); *F24F 13/08* (2013.01); *F16K 99/0048* (2013.01); *F16K 99/0049* (2013.01)

(58) Field of Classification Search
CPC ........ F24F 1/0033; F24F 13/08; F24F 1/0018; F16K 99/0044; F16K 99/0048; F16K 99/0049
(Continued)

(56) References Cited

U.S. PATENT DOCUMENTS

| 4,561,422 A | 12/1985 | Hara et al. |
| 4,923,000 A | 5/1990 | Nelson |

(Continued)

FOREIGN PATENT DOCUMENTS

| EP | 1 596 136 A1 | 9/2014 | |
| JP | 61079938 A | * 4/1986 | ............ F24F 1/0007 |

(Continued)

OTHER PUBLICATIONS

International Search Report dated Nov. 26, 2015 in corresponding International Patent Application No. PCT/KR2015/009471.
(Continued)

*Primary Examiner* — Edelmira Bosques
*Assistant Examiner* — Frances F. Hamilton
(74) *Attorney, Agent, or Firm* — Staas & Halsey LLP

(57) ABSTRACT

An air current changeable full front blowing type air conditioner is provided. The air current changeable full front blowing type air conditioner includes: a case configured to comprise a heat exchanger disposed inside the case; a main air blower configured to be disposed in rear of the heat exchanger inside the case and discharge a main air current from a full front of the case; and at least one auxiliary air blower configured to be positioned around the main air blower of the case and discharge an auxiliary air current for changing a direction of the main air current. The auxiliary air blower discharges the auxiliary air current in a direction where the auxiliary air current interferes with the main air current discharged from the full front of the case.

15 Claims, 20 Drawing Sheets

(51) Int. Cl.
*F24F 13/08* (2006.01)
*F16K 99/00* (2006.01)

(58) Field of Classification Search
USPC .......................................................... 454/269
See application file for complete search history.

(56) References Cited

U.S. PATENT DOCUMENTS

| | | | | |
|---|---|---|---|---|
| 5,148,683 A * | 9/1992 | Muller | ................. | F24F 1/0007 62/180 |
| 5,950,446 A | 9/1999 | Tromblee et al. | | |
| 5,984,649 A * | 11/1999 | Kato | ................. | F24F 1/0007 219/200 |
| 6,123,145 A * | 9/2000 | Glezer | ................. | B64C 21/08 165/104.33 |
| 6,164,933 A | 12/2000 | Tani et al. | | |
| 6,848,631 B2 * | 2/2005 | Monson | ................. | F16J 3/02 239/102.1 |
| 7,248,475 B2 * | 7/2007 | Paydar | ................. | F04D 29/582 361/695 |
| 7,312,973 B2 * | 12/2007 | Sekoguchi | ................. | A61L 9/22 361/231 |
| 7,334,424 B2 * | 2/2008 | Park | ................. | F24F 1/0007 62/428 |
| 7,362,032 B2 * | 4/2008 | Pelrine | ................. | A61M 5/142 310/309 |
| 7,397,164 B1 * | 7/2008 | Ali | ................. | G06F 1/203 310/311 |
| 7,461,518 B2 * | 12/2008 | Higashida | ................. | F04D 29/4213 62/419 |
| 7,621,725 B2 * | 11/2009 | Huang | ................. | F04D 33/00 416/146 R |
| 7,633,753 B2 * | 12/2009 | Sauciuc | ................. | G06F 1/20 174/16.1 |
| 7,742,299 B2 * | 6/2010 | Sauciuc | ................. | H05K 7/20163 174/16.1 |
| 7,911,115 B2 * | 3/2011 | Pelrine | ................. | A61M 5/142 310/328 |
| 7,957,140 B2 * | 6/2011 | Mongia | ................. | G06F 1/203 165/104.33 |
| 7,971,850 B2 * | 7/2011 | Heim | ................. | F16K 99/0001 239/597 |
| 8,072,121 B2 * | 12/2011 | Heim | ................. | F04B 19/006 310/330 |
| 8,190,303 B2 * | 5/2012 | Lin | ................. | G05D 23/1932 165/200 |
| 8,222,799 B2 * | 7/2012 | Polyakov | ................. | G06F 3/0202 310/365 |
| 8,297,947 B2 * | 10/2012 | Van Rensburg | ................. | F04F 7/00 417/213 |
| 8,308,452 B2 * | 11/2012 | Amirouche | ................. | F04B 43/046 417/413.2 |
| 8,443,622 B2 * | 5/2013 | Kim | ................. | F24F 1/0014 62/426 |
| 8,696,329 B2 * | 4/2014 | Busch | ................. | F04B 43/04 417/413.1 |
| 8,934,240 B2 * | 1/2015 | Yu | ................. | F04D 33/00 361/694 |
| 8,976,525 B2 * | 3/2015 | de Bock | ................. | H05K 7/20172 361/694 |
| 9,074,780 B2 * | 7/2015 | Lee | ................. | F24F 1/0059 |
| 9,103,337 B2 * | 8/2015 | Hirata | ................. | F04B 43/046 |
| 9,415,413 B2 * | 8/2016 | Whalen | ................. | B05B 17/0638 |
| 9,471,116 B2 * | 10/2016 | de Bock | ................. | H05K 7/20172 |
| 10,125,758 B2 * | 11/2018 | Ducharme | ................. | F04B 43/0054 |
| 10,226,991 B2 * | 3/2019 | Stauffer | ................. | B60J 10/242 |
| 2003/0177899 A1 * | 9/2003 | Monson | ................. | F16J 3/02 92/98 R |
| 2005/0231914 A1 * | 10/2005 | Mikubo | ................. | G06F 1/20 361/699 |
| 2005/0257561 A1 * | 11/2005 | Lee | ................. | F04D 33/00 62/419 |
| 2005/0279120 A1 * | 12/2005 | Lee | ................. | F24F 1/0007 62/419 |
| 2006/0086138 A1 * | 4/2006 | Park | ................. | F24F 1/0007 62/428 |
| 2006/0213216 A1 | 9/2006 | Sakashita et al. | | |
| 2006/0270332 A1 * | 11/2006 | Kober | ................. | B60H 1/34 454/69 |
| 2007/0037506 A1 * | 2/2007 | Lee | ................. | F04D 33/00 454/184 |
| 2007/0116559 A1 * | 5/2007 | Higashida | ................. | F04D 29/4213 415/206 |
| 2008/0137289 A1 * | 6/2008 | Arik | ................. | G06F 1/20 361/689 |
| 2009/0107167 A1 * | 4/2009 | Kim | ................. | F24F 1/0014 62/426 |
| 2009/0148320 A1 * | 6/2009 | Lucas | ................. | F04B 43/046 417/481 |
| 2010/0242518 A1 * | 9/2010 | Yang | ................. | F24F 1/0007 62/262 |
| 2010/0296248 A1 * | 11/2010 | Campbell | ................. | H05K 7/20218 361/699 |
| 2011/0117830 A1 * | 5/2011 | Browne | ................. | B60J 9/04 454/192 |
| 2012/0142266 A1 * | 6/2012 | Niwa | ................. | F24F 11/0008 454/339 |
| 2014/0079566 A1 | 3/2014 | Gammack et al. | | |
| 2014/0273796 A1 * | 9/2014 | Giammattei | ................. | F04B 43/046 454/251 |
| 2015/0050877 A1 * | 2/2015 | Yano | ................. | F24F 7/007 454/338 |
| 2015/0153063 A1 | 6/2015 | Yasutomi | | |
| 2015/0159907 A1 * | 6/2015 | Kwon | ................. | F24F 13/08 165/120 |

FOREIGN PATENT DOCUMENTS

| | | | | |
|---|---|---|---|---|
| JP | 04169738 A | * | 6/1992 | ............ F24F 1/0011 |
| JP | 11-311184 | | 11/1999 | |
| JP | 2013-113542 | | 6/2013 | |
| JP | 2013-178074 | | 9/2013 | |
| JP | 2014-55734 | | 3/2014 | |
| KR | 1989-0003895 B1 | | 10/1989 | |
| KR | 2002-0072353 | | 9/2002 | |
| KR | 10-2005-0108490 A | | 11/2005 | |

OTHER PUBLICATIONS

International Written Opinion of the International Searching Authority dated Nov. 26, 2015 in corresponding International Patent Application No. PCT/KR2015/009471.
Korean Office Action (dated Sep. 29, 2020) issued by the Korean Patent Office for Korean Patent Application No. 10-2014-0121721 which was filed on Sep. 15, 2014.

* cited by examiner

AIR CURRENT CHANGEABLE FULL FRONT BLOWING TYPE AIR CONDITIONER

CROSS-REFERENCE TO RELATED APPLICATIONS

This application is a U.S. National Stage Application, which claims the benefit under 35 U.S.C. § 371 of PCT International Patent Application No. PCT/KR2015/009471, filed Sep. 9, 2015 which claims the foreign priority benefit under 35 U.S.C. § 119 of Korean Patent Application No. 10-2014-0121721, filed Sep. 15, 2014, the contents of which are incorporated herein by reference.

TECHNICAL FIELD

The present general inventive concept relates to providing an indoor unit of an air conditioner, and more particularly, to providing a full front blowing type air conditioner that changes a direction of a main air current blowing from a full front through an auxiliary air current.

BACKGROUND ART

In general, an air conditioner refers to an apparatus that cools and/or heats an indoor space by using a refrigeration cycle of a refrigerant formed of a compressor, a condenser, an expander, and a heat exchanger in order to create a more pleasant indoor environment for a user. The air conditioner may be classified into a system type, a stand type, a window type, and a wall-mounted type according to installation shapes thereof.

The wall-mounted type air conditioner includes a discharge grill that is formed in a full front of a case of an indoor unit to discharge an air and a heat exchanger that is installed to be opposite to the discharge grill. In this case, a slim air conditioner is realized through an inflow grill that is formed in a side of the case to enable an external air to flow in, a thin film is installed in the rear of the indoor unit and moves back and forth in order to enable an external air flow in, and an air blower that pressurizes the flowing air through the heat exchanger.

However, in the air conditioner having the above-described structure, the heat exchanger is disposed on a whole surface of the indoor unit to discharge a cold air or a warm air from the whole surface of the indoor unit. Therefore, comfortableness may be improved with a low flow velocity, but a direction of wind may not be controlled in terms of an air blowing structure.

In particular, when a full front blowing type air conditioner operates in an air-conditioning mode, a cold air sinks, and thus an indoor inhabited area of a user is efficiently cooled. When the full front blowing type air conditioner operates in a heating mode, a hot air moves up, and thus the full front blowing type air conditioner is disadvantageous to heating of a real inhabited area. Also, when the user demands strong immediate wind in an initial stage, and thus a skin sensory temperature is required to be lowered due to the strong wind, it is impossible to realize the full front blowing type air conditioner.

DISCLOSURE

Technical Problem

The exemplary embodiments concept provide an air conditioner that may arbitrarily change a direction of a main air current, which is discharged from a full front of a case of an indoor unit, by a user.

Technical Solution

According to an aspect of the exemplary embodiments, there is provided an air conditioner including: a case configured to include a heat exchanger disposed inside the case; a main air blower configured to be disposed in rear of the heat exchanger inside the case and discharge a main air current from a full front of the case; and at least one auxiliary air blower configured to be positioned around the main air blower of the case and discharge an auxiliary air current for changing a direction of the main air current. The auxiliary air blower may discharge the auxiliary air current in a direction where the auxiliary air current interferes with the main air current discharged from the full front of the case.

The auxiliary air blower may be positioned on at least one of upper, lower, left, and right sides of the heat exchanger.

The auxiliary air blower may include: a guide path configured to guide some of pulse jets discharged from the main air blower to use some of the pulse jets discharged from the main air blower as the auxiliary air current; and an air outlet configured to be formed along a longitudinal direction in the full front of the case and to be connected to the guide path to discharge the auxiliary air current.

The air outlet may be disposed above the heat exchanger, and a lower part of the case may be inclined downwards to be more adjacent to a rear part of the case than an upper part of the case.

A lower part of the full front of the case may be inclined downwards to be more adjacent to a rear part of the case than an upper part of the full front of the case.

The main air blower may include: housing configured to include a first air outlet discharging a pulse jet toward a front corresponding to the heat exchanger and a second air outlet discharging a pulse jet to the auxiliary air blower; and at least a pair of piezoelectric diaphragms configured to be disposed inside the housing to keep a space. The pair of piezoelectric diaphragms may be periodically changed into opposite phases to change an air pressure of the housing so as to discharge the pulse jets through the first and second air outlets.

The auxiliary air blower may include: a housing configured to include a slit formed in a side of the housing; and at least a pair of piezoelectric diaphragms configured to be disposed inside the housing to keep a space. The pair of piezoelectric diaphragms may be periodically changed into opposite phases to discharge an air of the housing through the slit.

The auxiliary air blower may include: at least a pair of housings configured to include slits respectively formed in sides of the pair of housings; at least a pair of piezoelectric diaphragms to be disposed inside the housing to keep a space; and a manifold configured to be disposed between the pair of housings, to be connected to the pair of housings, and to include a slit formed in a side of the manifold.

The auxiliary air blower may further include a driver configured to set a disposition angle of the housing within a preset angle range to enable the slit of the housing to head a direction interfering with the main air current or a reverse direction of the direction.

The driver may support a rear end of the housing to enable the housing to rotate.

A pair of auxiliary air blowers may be respectively disposed above and under the heat exchanger and simultaneously discharge auxiliary air currents or only one of the pair of auxiliary air blowers may discharge an auxiliary air current.

Auxiliary air blowers may be respectively disposed on upper, lower, left, and right sides of the heat exchanger one by one and simultaneously discharge auxiliary air currents, only one of pairs of auxiliary air blowers facing each other may discharge an auxiliary air current, or at least one of the auxiliary air blowers may discharge an auxiliary air current.

The auxiliary air blower may be a cross flow fan or an impeller fan.

The main air blower may include: a housing configured to include an air outlet discharging a pulse jet toward the heat exchanger; and a plurality of piezoelectric diaphragms configured to be disposed inside the housing to keep spaces from one another. The plurality of piezoelectric diaphragms may be periodically changed into opposite phases to change an air pressure of the housing so as to discharge a pulse jet through an air outlet.

The plurality of piezoelectric diaphragms may be disposed in a matrix a pair by a pair.

According to another aspect of the exemplary embodiments, there is provided an air conditioner including: a case configured to include an area that is formed in a whole area of a full front of the case to discharge a main air current; a heat exchanger configured to have an area corresponding to a discharge area of the case; a main air blower configured to be disposed in rear of the heat exchanger inside the case to discharge an air toward the heat exchanger; and at least one auxiliary air blower configured to be disposed around the main air blower and discharge an auxiliary air current in a direction where the auxiliary air current interferes with the main air current. The main air blower discharges a main air current from an area corresponding to the whole area of the full front of the case.

MODE FOR INVENTION

Figure 1:
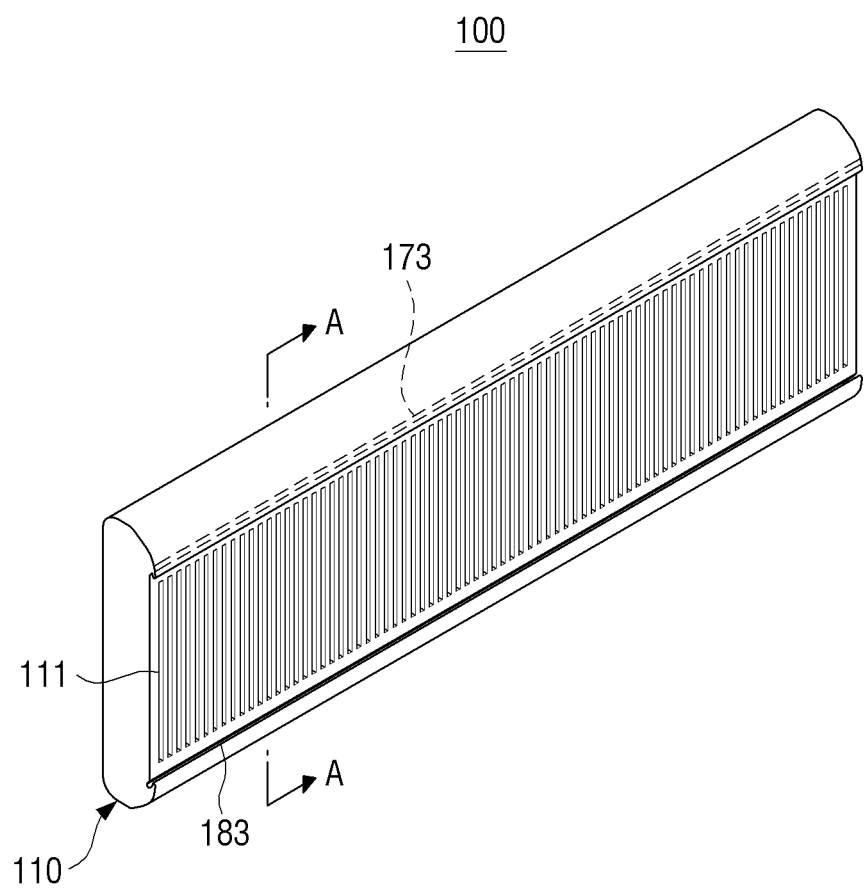
FIG. 1 is a perspective view illustrating an indoor unit of an air conditioner according to an exemplary embodiment of the present general inventive concept.

Exemplary embodiments are described in greater detail with reference to the accompanying drawings. In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

An air conditioner of the present general inventive concept is a wall-mounted type air conditioner for cooling, heating, or both cooling and heating, i.e., a full front blowing type air conditioner that blows air from a full front of a case forward. An air blowing area of the air conditioner of the present general inventive concept is remarkably wider than an air blowing area of an existing wall-mounted type air conditioner, and an air flow velocity of the air conditioner of the present general inventive concept may be set to be slow so as to perform pleasant cooling or heating.

Also, the air conditioner of the present general inventive concept includes a main air blower and at least one auxiliary air blower. The main air blower discharges a main air current through the full front of the case, and the auxiliary air blower discharges an auxiliary air current that changes a direction of the main air current. The auxiliary air blower may be disposed on at least one of upper, lower, left, and right sides of the main air blower and discharge the auxiliary air current in a direction, where the auxiliary air current interferes with the main air current, to change the direction of the main air current.

For example, a main air current, which is discharged at a high temperature from the full front of the case when performing heating, is discharged by a convective phenomenon and then moves upwards in front of the air conditioner. In this case, the auxiliary air current discharged from the auxiliary air blower disposed above the main air blower naturally pushes the main air current downwards to change the direction of the main air current so as to enable the main air current to move downwards. Therefore, a warm air rises from a preset distance spaced apart from a front of the indoor unit, and thus an indoor space may be effectively heated.

A full front blowing type air conditioner according to various exemplary embodiments of the present general inventive concept will now be described in detail with reference to the attached drawings.

Figure 2A:
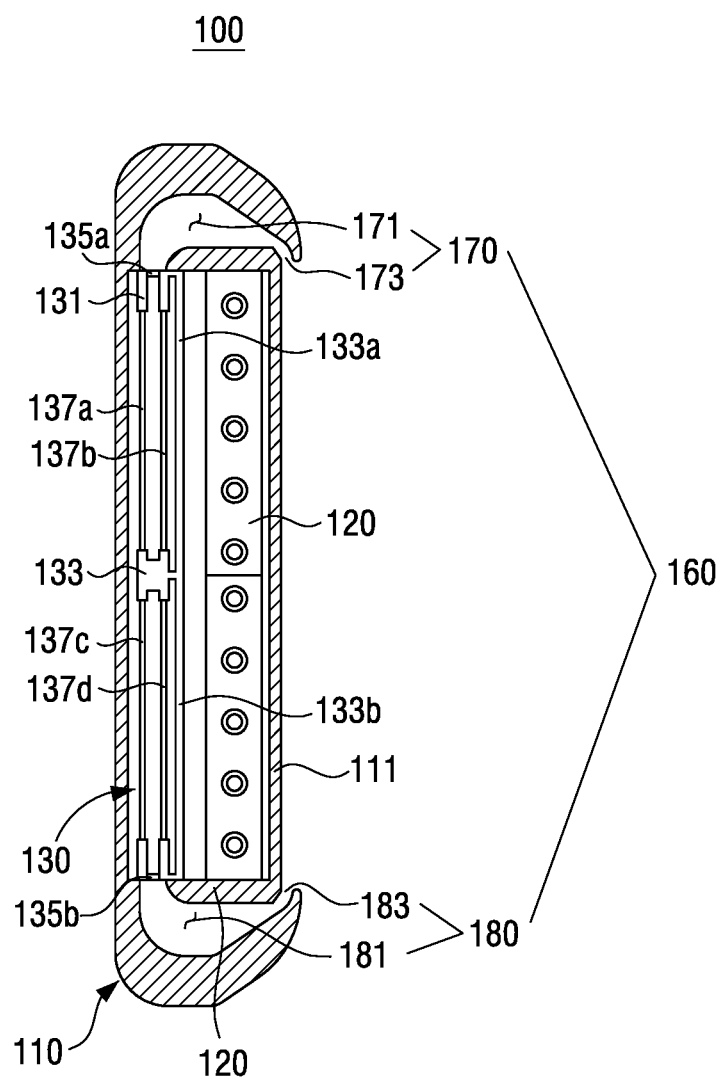
FIG. 2A is a cross-sectional view taken along line A-A of FIG. 1.
Figure 2B:
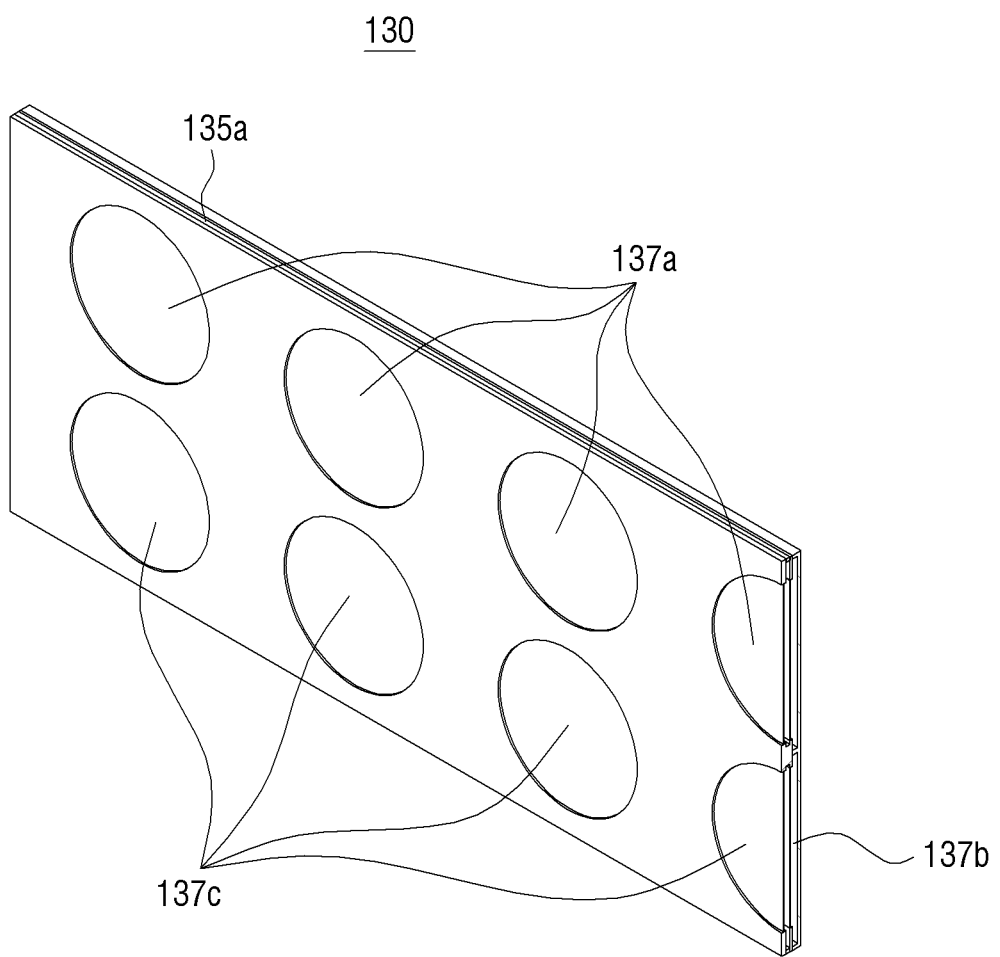
FIG. 2B is a schematic perspective view illustrating a main air blower of FIG. 2A.
Figure 3:
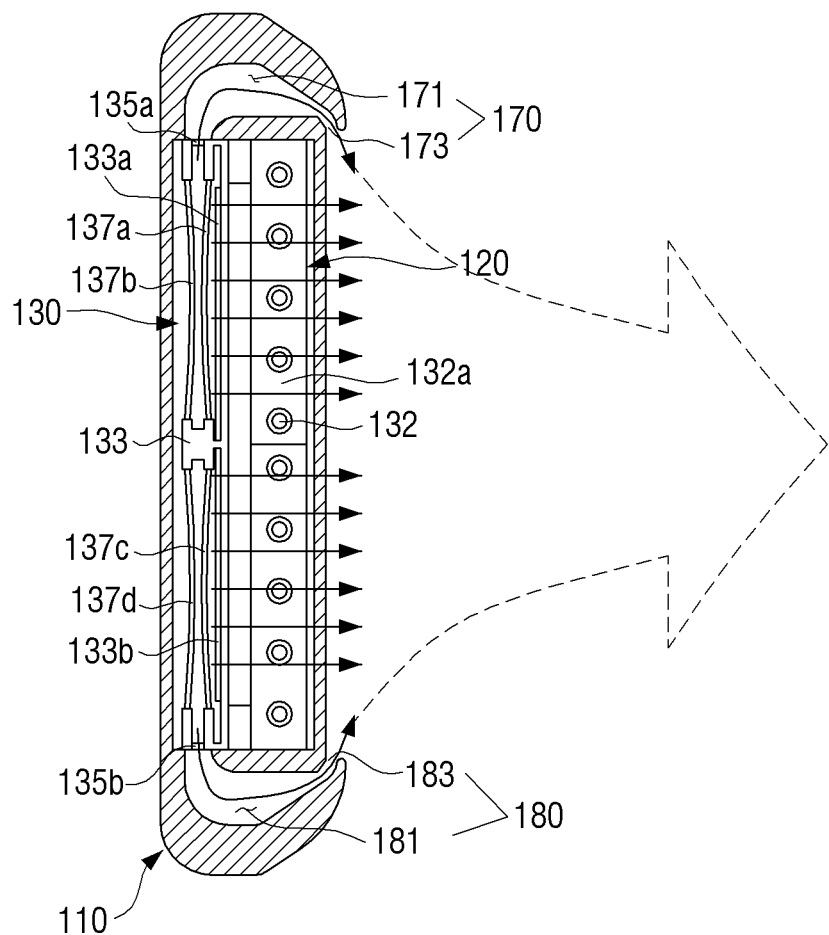
FIGS. 3 through 5 are cross-sectional views illustrating a direction of a main air current that is variously changed when auxiliary air currents are discharged from upper and lower auxiliary air blowers due to the main air current discharged from a main air blower.
Figure 4:
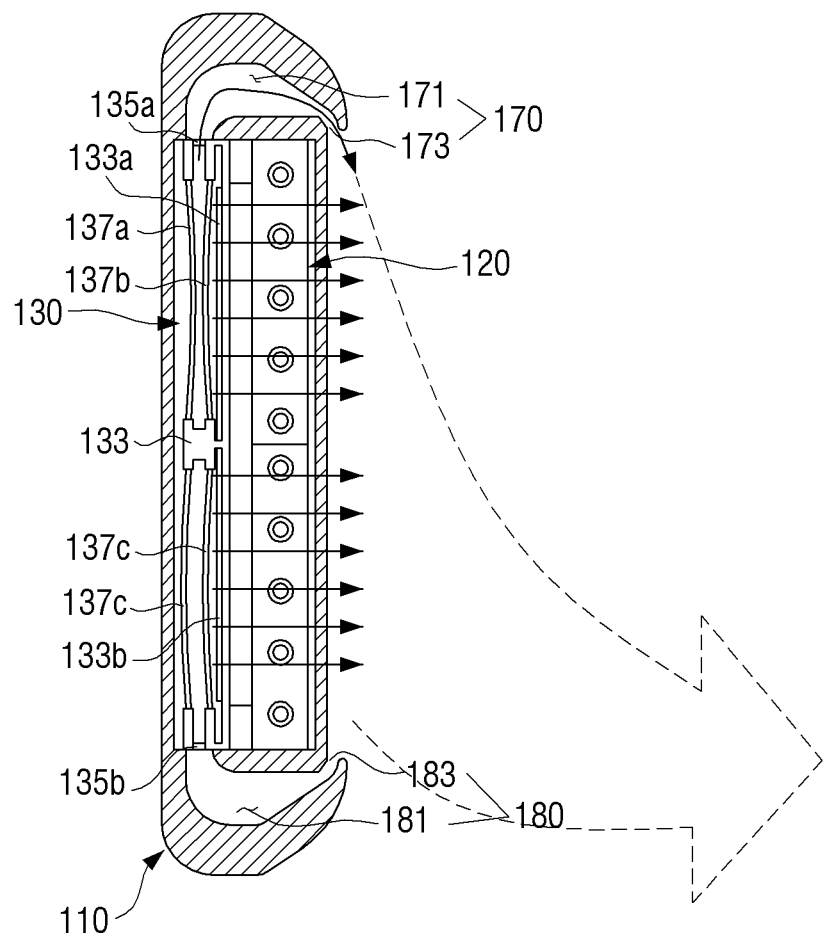
Figure 5:
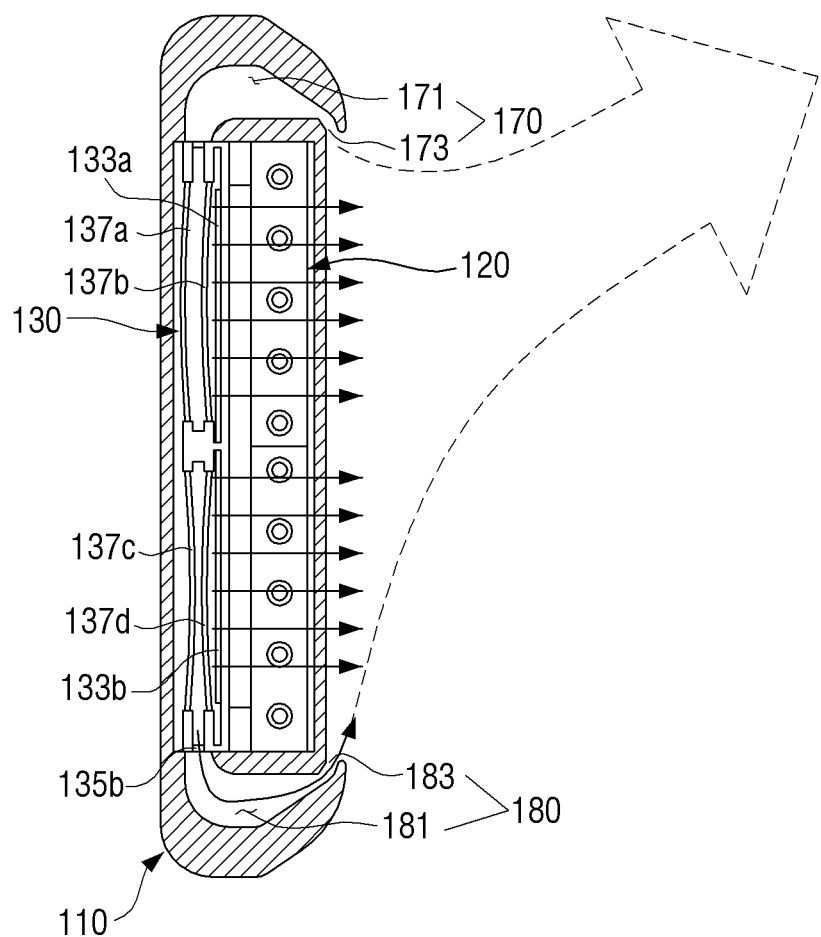

FIG. 1 is a perspective view illustrating an indoor unit of an air conditioner according to an exemplary embodiment of the present general inventive concept. FIG. 2 is a cross-sectional view taken along line A-A of FIG. 1. FIG. 2B is a schematic perspective view illustrating a main air blower of FIG. 2A. FIGS. 3 through 5 are cross-sectional views illustrating a direction of a main air current that is variously changed by auxiliary air currents discharged from upper and lower auxiliary air blowers when a main air current is discharged from a main air blower.

FIGS. 1, 2A, and 2B, an indoor unit of an air changeable air conditioner 100 includes a case 110, a heat exchanger 120, a main air blower 130, and an auxiliary air blower 160.

The heat exchanger 120, the main air blower 130, and the auxiliary air blower 160 are respectively disposed inside the case 110. A back surface of the case 110 is installed on a wall, and a plurality of air outlets 111 are formed in a front surface of the case 110.

The plurality of air outlets 111 are formed in a vertical direction as a plurality of slits that are formed to keep preset spaces from one another along a horizontal direction. In this case, the plurality of air outlets 111 are approximately formed in a whole area of the full front of the case 110 to maximize an air blowing area of a main air current discharged from the main air blower 130.

Also, a plurality of air inlets (not shown) are formed in at least one of back, upper, and lower surfaces of the case 110. The plurality of air inlets may be formed as in wider areas as possible to keep a flow of an air flowing into the case 110 maximum.

The heat exchanger 120 is disposed inside the case 110 to be adjacent to the plurality of air outlets 111. In this case, the heat exchanger 120 is disposed to have an area approximately corresponding to the whole area of the full front of the case 110.

For example, as shown in FIG. 2A, two pieces of the heat exchanger 120 are disposed up and down to enable the heat exchanger 120 to correspond to the whole area of the full front of the case 110. This disposition of the heat exchanger 120 is to enable airs discharged through the plurality of air outlets 111 to be entirely discharged through the heat exchanger 120.

The main air blower 130 is disposed in the rear of the heat exchanger 120 inside the case 110 and discharges an air toward the heat exchanger 120. The main air blower 130 includes a housing 131 that is formed to be slim and have an area corresponding to the heat exchanger 120 and a plurality of piezoelectric diaphragms 137a, 137b, 137c, and 137d that are disposed inside the housing 131 to keep spaces from one another.

A plurality of air outlets 133a and 133b for discharging airs are formed in a front surface of the housing 131. In this case, the plurality of air outlets 133a and 133b may be a plurality of slits that are formed in a vertical direction to keep spaces from one another in a horizontal direction.

Also, an upper slit 135a is formed above the housing 131, and a lower slit 135b is formed under the housing 131. The upper slit 135a is a path through which a pulse jet is discharged by piezoelectric diaphragms 137a and 137b that are disposed above to make a pair among piezoelectric diaphragms 137a through 137d that are disposed in two columns. The lower slit 135b is a path through which a pulse jet is discharged by the piezoelectric diaphragms 137c and 137d that are disposed under to make a pair among the piezoelectric diaphragms 137a through 137d that are disposed in the two columns.

Referring to FIGS. 2A and 2B, the plurality of piezoelectric diaphragms 137a through 137d are disposed to keep spaces from one another in columns and rows so as to make each pair. However, the plurality of piezoelectric diaphragms 137a through 137d are not limited to the above disposition and thus may be disposed in a column. Also, if the case 110 and the heat exchanger 120 are manufactured in large sizes, the plurality of piezoelectric diaphragms 137a through 137d may be disposed in three or more columns.

The plurality of piezoelectric diaphragms 137a through 137d are ferroelectric materials (e.g., piezoelectric transistors (PZTs)) formed as thin films and have phases that are periodically changed by a voltage applied from an external source. In other words, shapes of the piezoelectric diaphragms 137a through 137d may be changed to enable the piezoelectric diaphragms 137a through 137d to alternately protrude toward the heat exchanger 120 and an opposite side to the heat exchanger 120.

Also, the plurality of piezoelectric diaphragms 137a through 137d are disposed to make pairs, and the phases of the piezoelectric diaphragms 137a through 137d are changed in opposite directions (as shown in FIG. 3) or in the same direction (as shown in FIGS. 4 and 5), so as to discharge the pulse jet toward the heat exchanger 120. The pulse jet passes through the heat exchanger 120 to enable a temperature thereof to be changed (to absorb or discharge heat energy) and finally forms a main air current that is discharged through the full front of the case 110.

The plurality of piezoelectric diaphragms 137a through 137d are disposed to make pairs so as to enable the pairs to be parallel with each other and may be disposed to be parallel with sides of the plurality of piezoelectric diaphragms 137a through 137d facing the heat exchanger 120.

Referring to FIG. 2A, the auxiliary air blower 160 includes an upper auxiliary flow path 170 and a lower auxiliary flow path 180 that are respectively disposed above and under the main air blower 130.

In the present exemplary embodiment, the upper and lower auxiliary flow paths 170 and 180 discharge auxiliary air currents toward the full front of the case 110 by using the pulse jet discharged from the main air blower 130.

The upper auxiliary flow path 170 includes a guide path 171 and an upper air outlet 173 that are connected to the guide path 171. The guide path 171 is formed from an upper side of the main air blower 130 to the full front of the case 110 through an upper side of the heat exchanger 120 inside the case 110. The guide path 171 also guides the pulse jet, which is discharged from the upper slit 135a formed in the housing 131 of the main air blower 130, to the upper air outlet 173. The upper air outlet 173 is disposed above the plurality of air outlets 111 of the case 110 and is formed to head a direction that is inclined downwards at a preset angle toward the case 110. Therefore, an auxiliary air current, which is discharged from the upper air outlet 173, is discharged toward the main air current to change a direction of the main air current so as to enable the main air current to move downwards.

The lower auxiliary flow path 180 has a similar structure to the upper auxiliary flow path 170 except that the lower auxiliary air flow path 180 is disposed under the main air blower 130. In other words, the lower auxiliary flow path 180 includes a guide path 181 and a lower air outlet 183. The guide path 181 is formed from a lower side of the main air blower 130 to the full front of the case 110 through a lower side of the heat exchanger 120 inside the case 110. The guide path 181 also guides a pulse jet, which is discharged from the lower slit 135b, to the lower air outlet 183. The lower air outlet 183 is disposed under the plurality of air outlets 111 of the case 110 and is formed to head a direction that is inclined upwards at a preset angle toward the full front of the case 110. Therefore, an auxiliary air current, which is discharged from the lower air outlet 183, is discharged toward the main air current to change the direction of the main air current so as to enable the main air current to move upwards.

The main air blower 130 has been described as an example of a piezoelectric actuator for discharging a pulse jet but is not limited thereto. Therefore, the main air blower 130 may be a cross flow fan, an impeller fan, or a mechanical actuator.

A change in a direction of a main air current through the air conditioner 100 having the above-described structure according to an exemplary embodiment of the present general inventive concept will now be described with reference to FIGS. 3 through 5.

Referring to FIG. 3, the air conditioner 100 according to the present exemplary embodiment may simultaneously discharge auxiliary air currents from upper and lower sides of the full front of the case 100 through the upper and lower auxiliary flow paths 170 and 180. In this case, a main air current moves toward the full front of the case 110 by auxiliary air currents discharged from upper and lower sides toward the main air current to be approximately focused in center.

Here, flows of the auxiliary air currents discharged from the upper and lower auxiliary flow paths 170 and 180 may be adjusted to further finely adjust a direction of the main air current.

The plurality of piezoelectric diaphragms 137a through 137d are periodically changed into opposite phases in each pair in order to enable the main air blower 130 to simultaneously discharge a pulse jet toward the upper and lower auxiliary flow paths 170 and 180. In other words, the pair of piezoelectric diaphragms 137a and 137b and the pair of piezoelectric diaphragms 137c and 137d are changed to be adjacent to each other and then changed to be away from each other.

Referring to FIG. 4, the air conditioner 100 according to the present exemplary embodiment may discharge an auxiliary air current from the upper side of the full font of the case 110 through the upper auxiliary flow path 170 so as not to discharge au auxiliary air current through the lower auxiliary flow path 180.

For this, phases of voltage waveforms applied to piezoelectric elements attached onto the piezoelectric diaphragms 137a through 137d are controlled to change the pair of piezoelectric diaphragms 137a and 137b disposed above into opposite phases and change the pair of piezoelectric diaphragms 137c and 137d disposed under into the same phase. In this case, the plurality of piezoelectric diaphragms 137a through 137d respectively discharge pulse jets toward the heat exchanger 120 and the upper auxiliary flow path 170 but do not discharge pulse jets toward the lower auxiliary flow path 180.

As described above, the main air current discharged from the full front of the case 110 is moved approximately downwards by the auxiliary air current discharged from the upper auxiliary flow path 170. In this case, if the air conditioner 100 performs both cooling and heating, the main air current may be forcibly changed downwards in consideration of a convective effect when performing heating, to effectively heat an inhabited area of an indoor space of a user.

Referring to FIG. 5, on the contrary to the above description, the air conditioner 100 according to the present exemplary embodiment may discharge an auxiliary air current downwards toward the full front of the case 110 through the lower auxiliary flow path 180 but may not discharge an auxiliary air current through the upper auxiliary flow path 170.

In this case, among the plurality of piezoelectric diaphragms 137a through 137d, the piezoelectric diaphragms 137a and 137b disposed above are changed into the same phase, and the piezoelectric diaphragms 137c and 137d disposed under are changed into opposite phases. Here, the plurality of piezoelectric diaphragms 137a through 137d respectively discharge pulse jets toward the heat exchanger 120 and the lower auxiliary flow path 170 but do not discharge pulse jets toward the upper auxiliary flow path 180.

Therefore, the main air current discharged from the full front of the case 110 is moved approximately upwards by the auxiliary air current discharged from the lower auxiliary flow path 180.

As described above, the full front blowing type air conditioner 100 according to the present exemplary embodiment is changed into a full front blowing method of strongly spraying the main air current to the user through the auxiliary air blower 160 in an initial cooling stage to quickly lower a skin temperature of the user, and turning off the auxiliary air blower 160 and operating only the main air blower 130 in intermediate and/latter cooling stages, in order to maximize an air blowing area. Therefore, the full front blowing type air conditioner 100 may keep a state for giving a pleasant feeling to the user and improve air-conditioning efficiency.

Also, the full front blowing type air conditioner 100 according to the present exemplary embodiment moves a warm main air current, which is discharged through the full front of the case 110, downwards in consideration of a convective effect when performing heating. Therefore, the warm main air current may effectively heat the inhabited area of the user that keeps a preset distance from the full front blowing type air conditioner 100.

Full front blowing type air conditioners 200, 300, 400, 500, 600, 700, and 800 according to exemplary embodiments of the present general inventive concept will now be sequentially described. However, detailed descriptions of the same elements as those of the full front blowing type air conditioner 100 are omitted, and different elements from those of the full front blowing type air conditioner 100 will be described.

A full front blowing type air conditioner 200 according to an exemplary embodiment of the present general inventive concept will now be described with reference to FIGS. 6 and 7.

Figure 6:
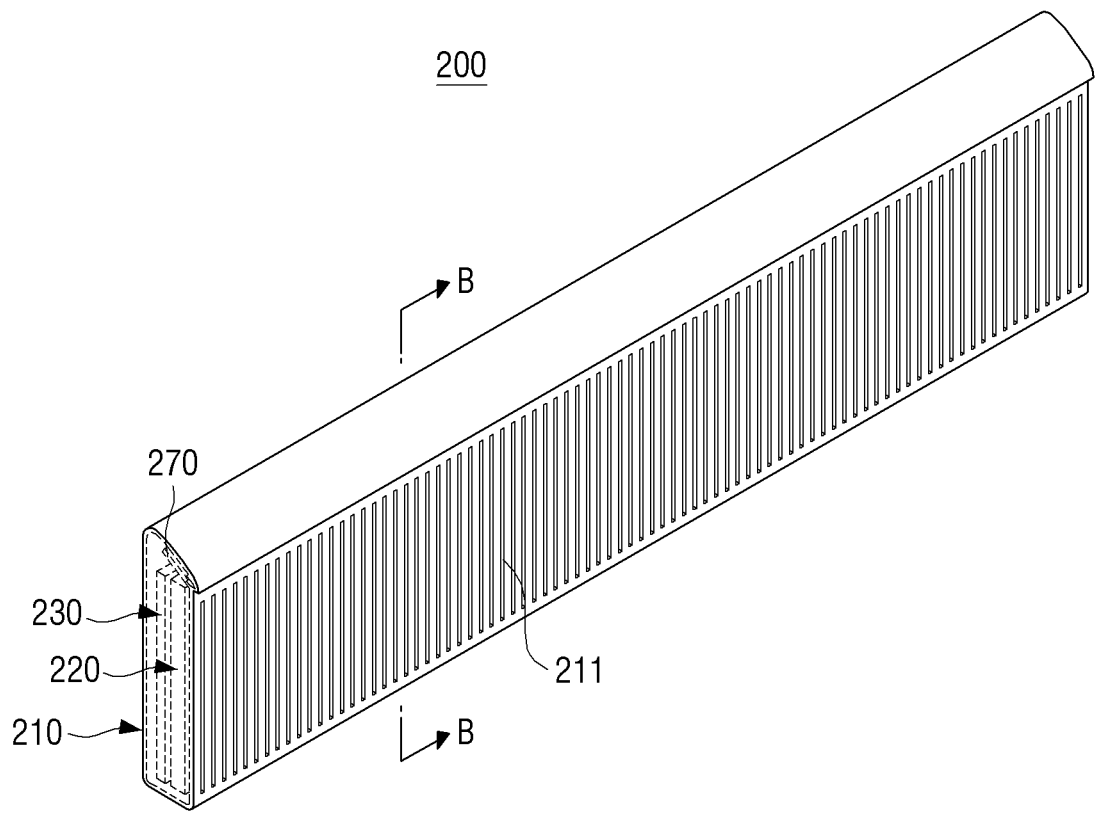
FIG. 6 is a perspective view illustrating an air conditioner according to another exemplary embodiment of the present general inventive concept.

FIG. 6 is a perspective view illustrating the full front blowing type air conditioner 200 according to an exemplary embodiment of the present general inventive concept. FIG. 7 is a cross-sectional view taken along line B-B of FIG. 6, i.e., a cross-sectional view illustrating a direction of a main current that moves down when the main air current is discharged from a main air blower and simultaneously, an auxiliary air current is discharged from an auxiliary air blower.

Referring to FIG. 6, the full front blowing type air conditioner 200 according to the present exemplary embodiment includes a case 210 that has a plurality of air outlets 211 formed in a front surface of the case 210, and a heat exchanger 220, a main air blower 230, and an auxiliary air blower 270 that are disposed inside the case 210.

Differently from the previous exemplary embodiment, in the present exemplary embodiment, the auxiliary air blower 270 is disposed above the main air blower 230 and discharges an auxiliary air current without using a pulse jet of the main air blower 230.

Figure 7:
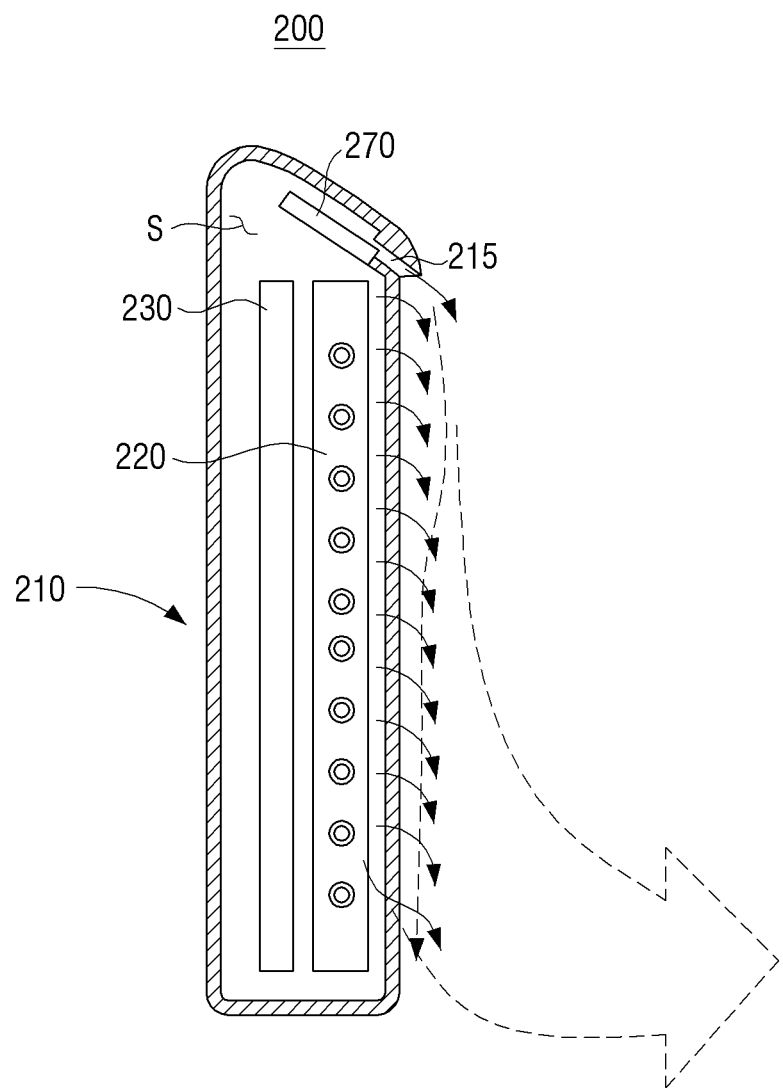
FIG. 7 is a cross-sectional view take along line B-B of FIG. 6, i.e., a cross-sectional view illustrating a direction of a main air current that moves down when the main air current is discharged from a main air blower and simultaneously, an auxiliary air current is discharged from an auxiliary air blower.

Referring to FIG. 7, the auxiliary air blower 270 is disposed along a longitudinal direction of the case 210 and discharges an auxiliary air current to an air outlet 215 that is formed above the plurality of air outlets 211 formed in the front surface of the case 210. The auxiliary air blower 270 may be a piezoelectric actuator, a voice coil motor (VCM) actuator, or the like that generates a pulse jet.

When a main air current is discharged through the plurality of air outlets 211 formed in the front surface of the case 110, the full front blowing type air conditioner 200 according to the present exemplary embodiment discharges an auxiliary air current from the auxiliary air blower 270 through the air outlet 215 in a direction where the auxiliary air current interferes with the main air current. Therefore, the main air current is pushed downwards by the auxiliary air current due to a coanda effect to move downwards along the full front of the case 210. The main air current moves forward from an area keeping a distance from the full front of the case 210, which is not affected by the auxiliary air current, and then rises due to a convective phenomenon. Therefore, the main air current effectively heats an inhabited area of the user.

Figure 8:
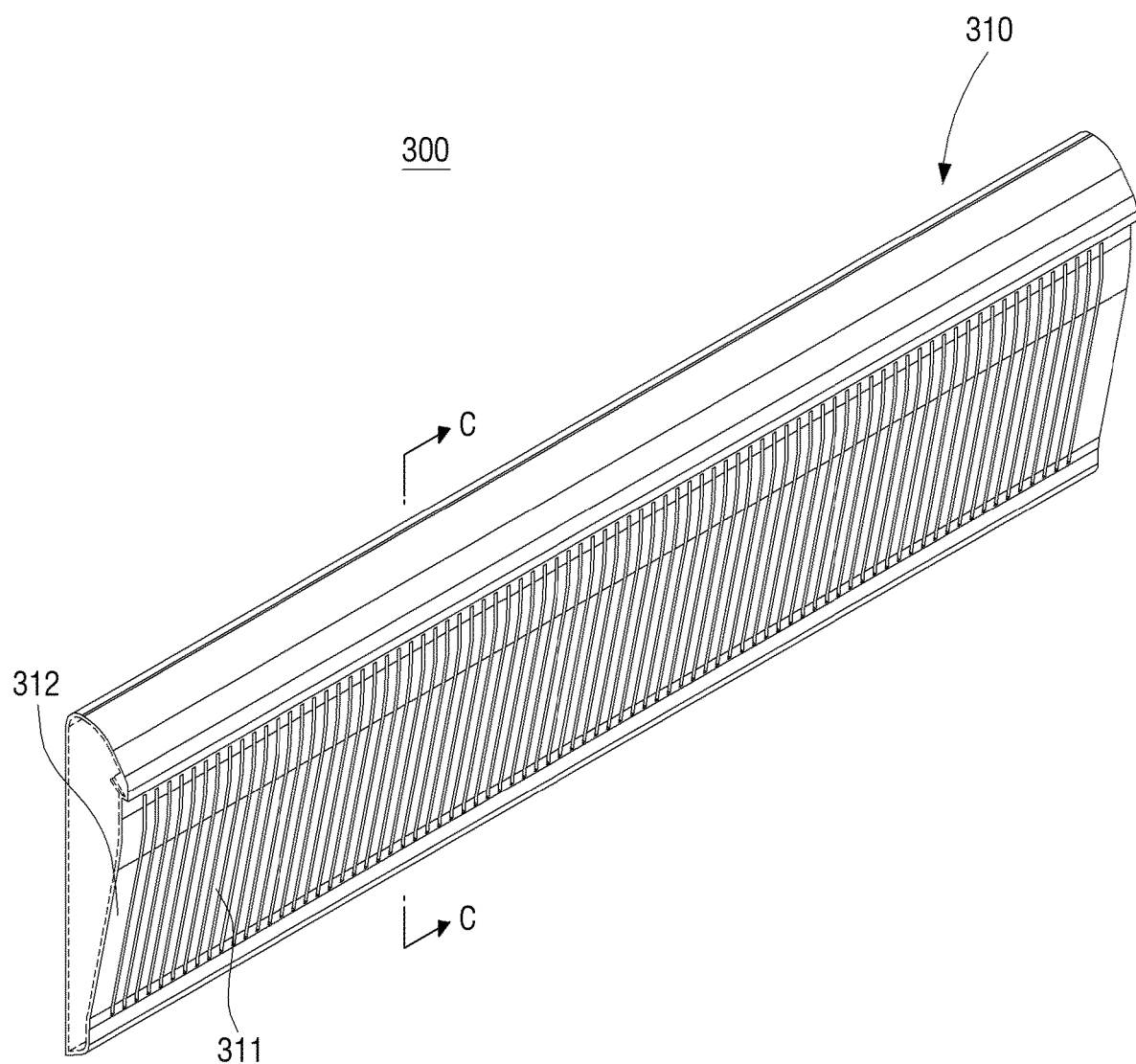
FIG. 8 is a perspective view illustrating an air conditioner according to another exemplary embodiment of the present general inventive concept.
Figure 9:
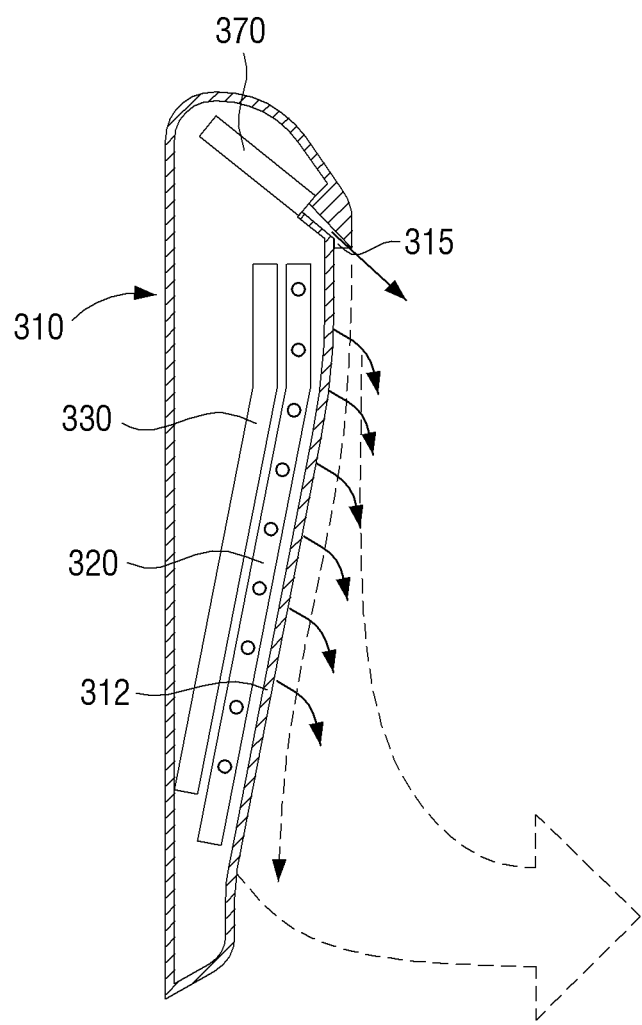
FIG. 9 is a cross-sectional view taken along line C-C of FIG. 8, i.e., a cross-sectional view illustrating a direction of a main air current that moves down when the main air current is discharged from a main air blower and simultaneously, an auxiliary air current is discharged from an auxiliary air blower.

FIG. 8 is a perspective view illustrating a full front blowing type air conditioner 300 according to another exemplary embodiment of the present general inventive concept. FIG. 9 is a cross-sectional view taken along line C-C of FIG. 8, i.e., a cross-sectional view illustrating a direction of a main air current that moves downwards when the main air current is discharged from a main air blower and simultaneously, an auxiliary air current is discharged from an auxiliary air blower.

Referring to FIG. 8, the full front blowing type air conditioner 300 according to the present exemplary embodiment includes a case 310 that has a plurality of air outlets 311 formed in a front surface 312 of the case, and a heat exchanger 320, a mail blower 330, and an auxiliary air blower 370 that are disposed inside the case 310.

Referring to FIG. 9, since the auxiliary air blower 370 is disposed above the main air blower 330, the auxiliary air blower 370 discharges an auxiliary air current toward a main air current discharged from a full front of the case 310 to change a movement direction of the main air current.

In the full front blowing type air conditioner 300 according to the present exemplary embodiment, a lower part of the full front of the case 310 is inclined downwards to be more adjacent to a rear part of the case 310 than an upper part of the full front. Therefore, if the main air current is discharged through the main air blower 330 and simultaneously, the auxiliary air current is discharged through the auxiliary air blower 370, the main air current moves downwards along the full front of the case 310 due to coanda effect. In this case, as the full front is inclined downwards, the main air current moves downwards to a further distance than in the exemplary embodiment described with reference to FIGS. 6 and 7.

Figure 10:
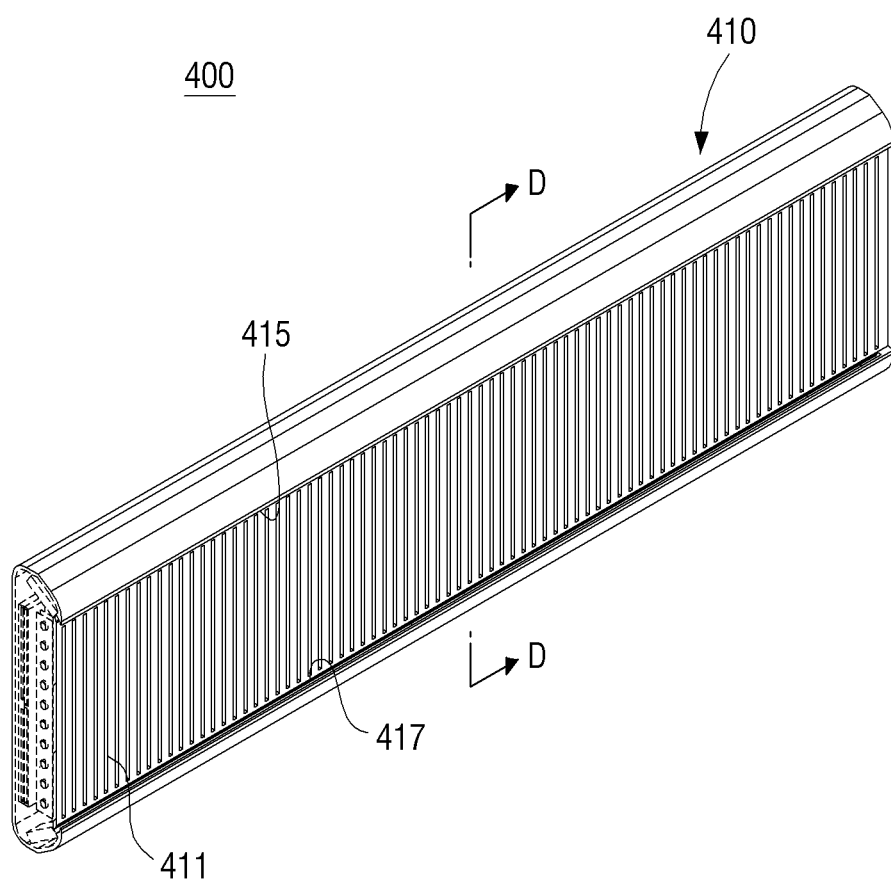
FIG. 10 is a perspective view illustrating an air conditioner according to another exemplary embodiment of the present general inventive concept.
Figure 11:
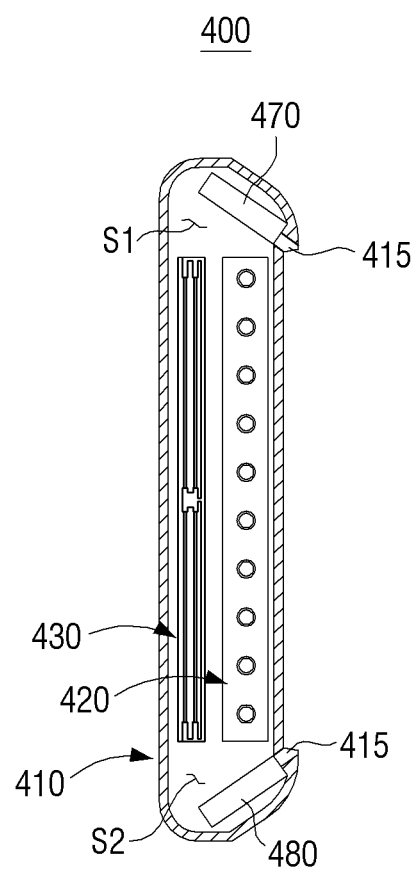
FIG. 11 is a cross-sectional view taken along line D-D of FIG. 10.

FIG. 10 is a perspective view illustrating a full front blowing type air conditioner 400 according to another exemplary embodiment of the present general inventive concept. FIG. 11 is a cross-sectional view taken along line D-D of FIG. 10.

Referring to FIGS. 10 and 11, as in the exemplary embodiment described with reference to FIGS. 6 and 7, the full front blowing type air conditioner 400 according to the present exemplary embodiment includes a case 410 that has a plurality of air outlets 411 formed in a front surface of the case 410, a heat exchanger 420 and a main air blower 430 that are disposed inside the case 410, and an upper auxiliary air blower 470 that is disposed above the main air blower 430.

The full front blowing type air conditioner 400 of the present exemplary embodiment further includes a lower auxiliary air blower 480 in comparison with the exemplary embodiment described with reference to FIGS. 6 and 7.

Therefore, the upper and lower auxiliary air blowers 470 and 480 respectively discharge auxiliary air currents through upper and lower air outlets 415 and 417 that are formed above and under the air outlets 411 of the case 410.

Like the auxiliary air blower 270 of the exemplary embodiment described with reference to FIGS. 6 and 7, the upper and lower auxiliary air blowers 470 and 480 may be piezoelectric actuators, VCM actuators, or the like that generate pulse jets.

Figure 12:
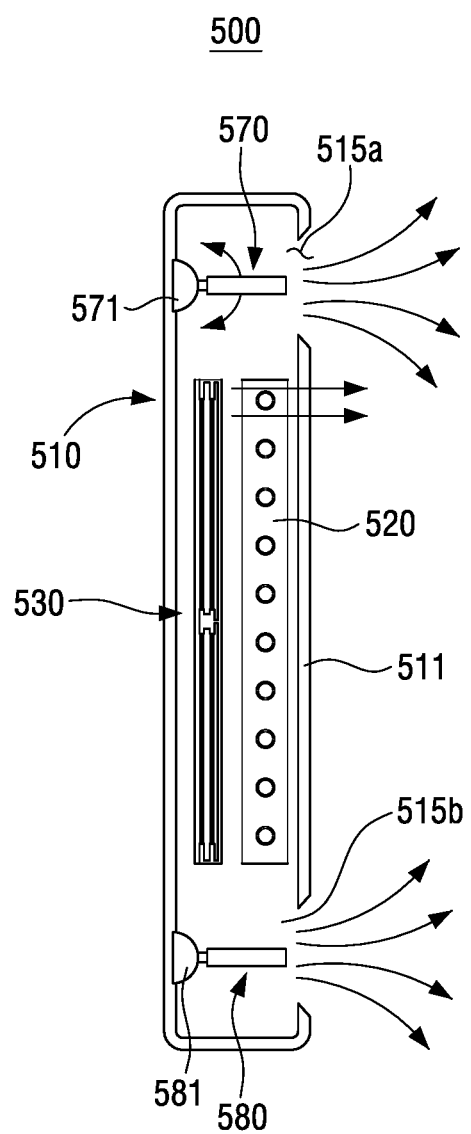
FIG. 12 is a cross-sectional view illustrating an air conditioner according to another exemplary embodiment of the present general inventive concept.

FIG. 12 is a cross-sectional view illustrating a full front blowing type air conditioner 500 according to another exemplary embodiment of the present general inventive concept.

Referring to FIG. 12, as in the exemplary embodiment described with reference to FIGS. 10 and 11, the full front blowing type air conditioner 500 according to the present exemplary embodiment includes a case 510 that has a plurality of air outlets 511 formed in a front surface of the case 510, and a heat exchanger 520, a main air blower 530, and upper and lower auxiliary air blowers 570 and 580 that are disposed inside the case 510.

Differently from the exemplary embodiment described with reference to FIGS. 10 and 11, in the full front blowing type air conditioner 500 according to the present exemplary embodiment, the upper and lower auxiliary air blowers 570 and 580 may rotate upwards (in a direction that is away from the main air current) and downwards (in a direction that is adjacent to the main air current) within preset angles to set arbitrary angles at which the upper and lower auxiliary air blowers 570 and 580 discharge auxiliary air currents.

The upper and lower auxiliary air blowers 570 and 580 discharge the auxiliary air currents through upper and lower air outlets 515a and 515b of the case 510. In this case, differently from the previous exemplary embodiments, the upper and lower air outlets 515a and 515b are formed above and under to be wider to enable the auxiliary air currents to be discharged at various angles by the upper and lower auxiliary air blowers 570 and 580 that rotate.

The upper and lower auxiliary air blowers 570 and 580 include drivers 571 and 581 that are connected to rear ends of the upper and lower auxiliary air blowers 570 and 580 so as to enable angles to be changed as described above. The drivers 571 and 581 may be disposed on an inner surface of the case 510 and may be motors that normally and reversely rotate or may include motors or rack and pinion structures operating with the motors.

Figure 13:
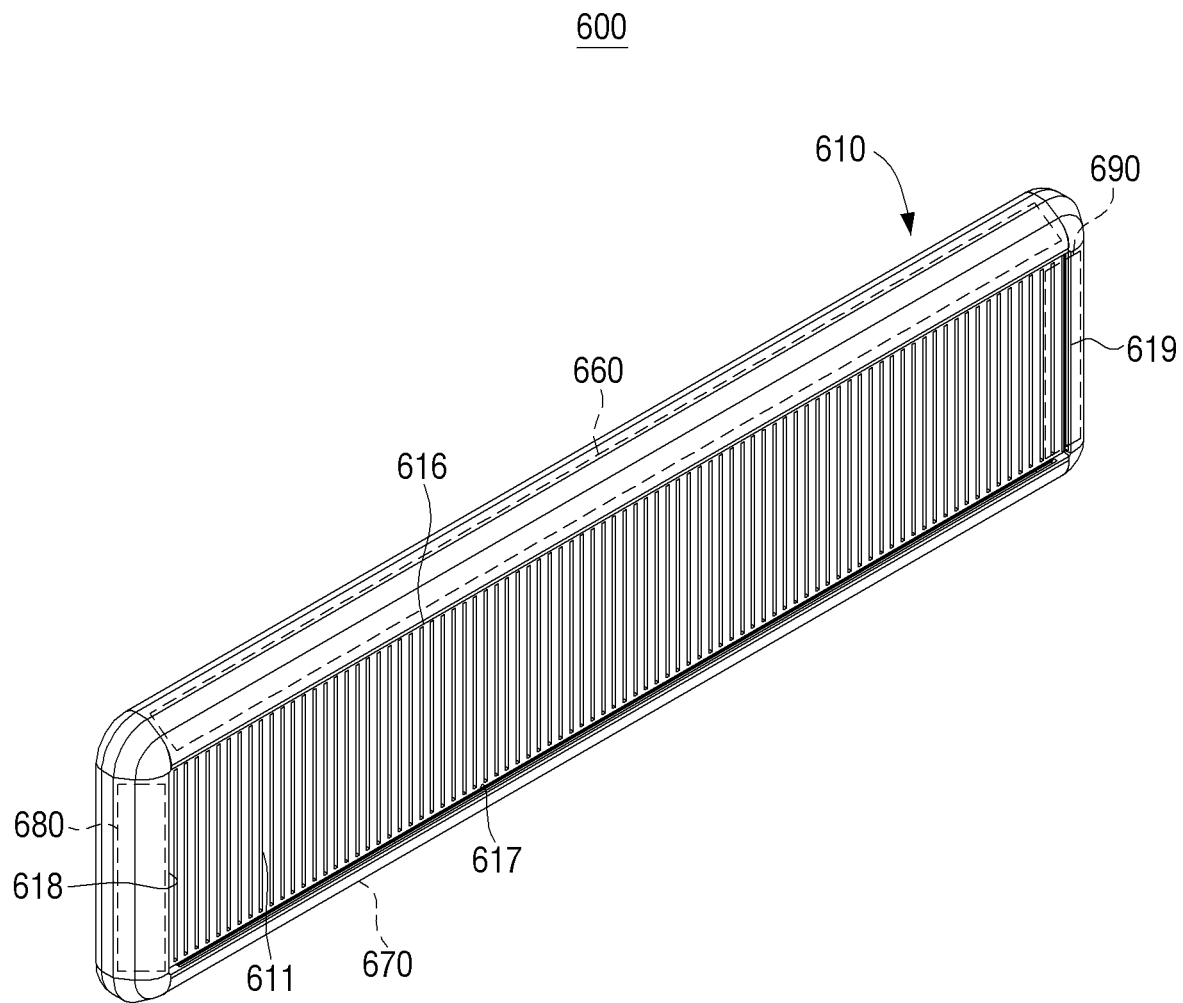
FIG. 13 is a perspective view illustrating an air conditioner according to another exemplary embodiment of the present general inventive concept.
Figure 14:
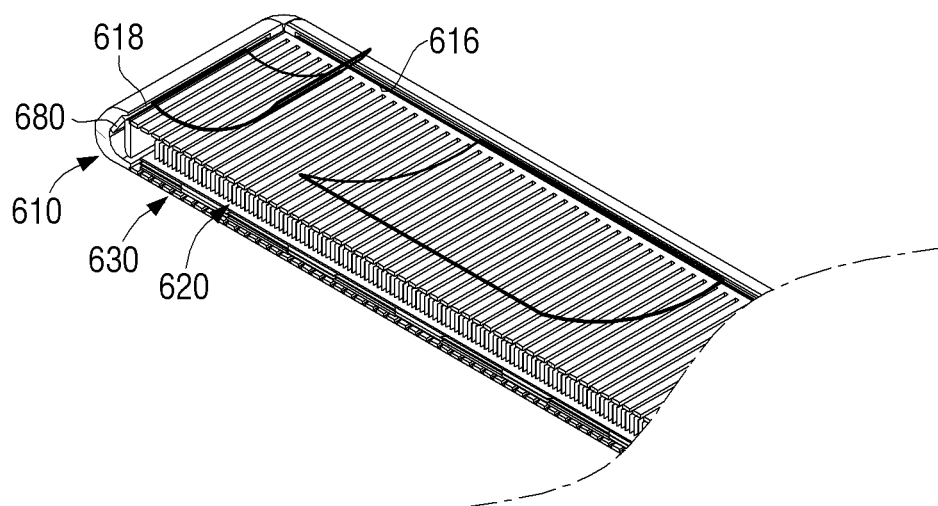
FIG. 14 is a cut perspective view illustrating the air conditioner of FIG. 13.

FIG. 13 is a perspective view illustrating a full front blowing type air conditioner 600 according to another exemplary embodiment of the present general inventive concept. FIG. 14 is a partially cut perspective view of the full front blowing type air conditioner 600.

Referring to FIGS. 13 and 14, as in the exemplary embodiment described with reference to FIGS. 10 and 11, the full front blowing type air conditioner 600 according to the present exemplary embodiment includes a case 610 that has a plurality of air outlets 611 formed in a front surface of the case 610, and a heat exchanger 620, a main air blower 630, and upper and lower auxiliary air blowers 660 670 that are disposed inside the case 610.

In the present exemplary embodiment, the full front blowing type air conditioner 600 further includes left and right auxiliary air blowers 680 and 690 that are formed inside the case 610. The left auxiliary air blower 680 is disposed on left side of the main air blower 630, and the right auxiliary air blower 690 is disposed on right side of the main air blower 630.

In this case, upper, lower, left, and right air outlets 616, 617, 618, and 619 are respectively formed on upper, lower, left, and right sides of the air outlets 611 in a full front of the case 610. The upper, lower, left, and right air outlets 616, 617, 618, and 619 are formed to enable auxiliary air currents, which are discharged from the upper, lower, left, and right auxiliary air blowers 660, 670, 680, and 690, to head a direction where the auxiliary air currents interfere with a main air current.

Therefore, in the present exemplary embodiment, the auxiliary air currents may be simultaneously discharged from upper, lower, left, and right sides of the full front of the case 610 or may be discharged from at least one of the upper, lower, left, and right sides to change a movement direction of the main air current.

Figure 15:
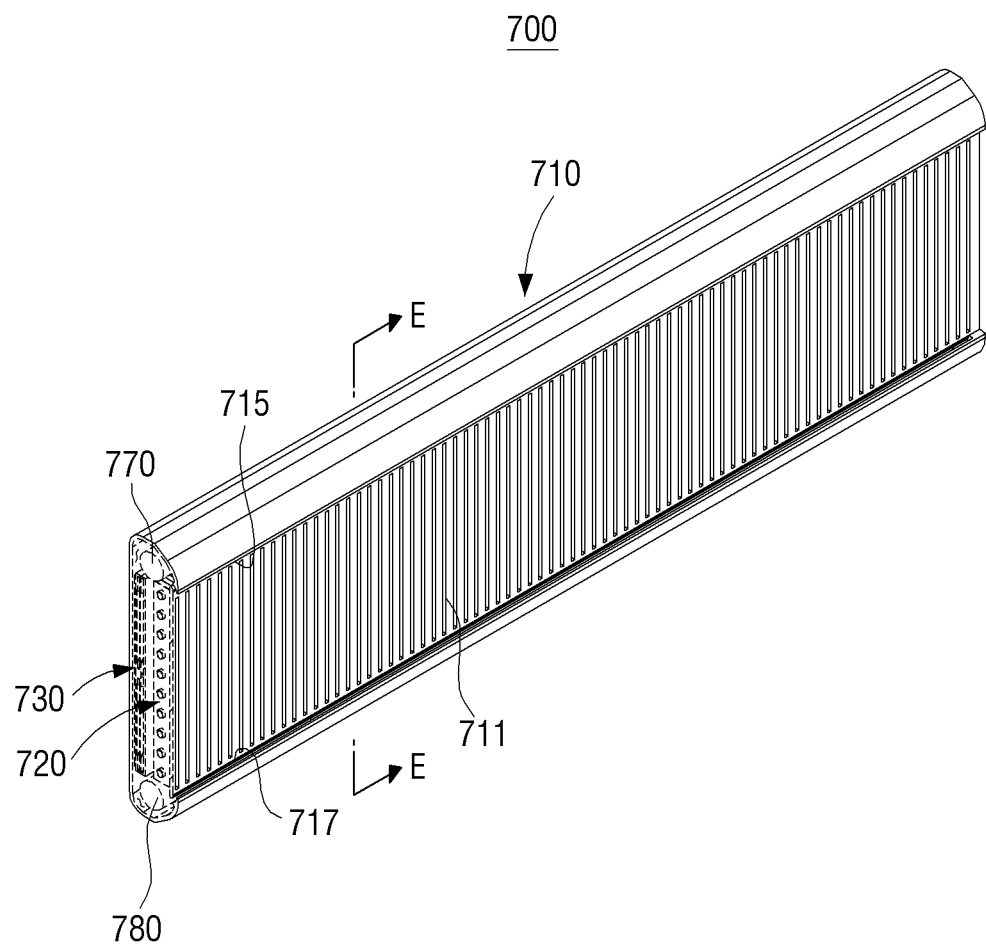
FIG. 15 is a perspective view illustrating an air conditioner according to another exemplary embodiment of the present general inventive concept.
Figure 16:
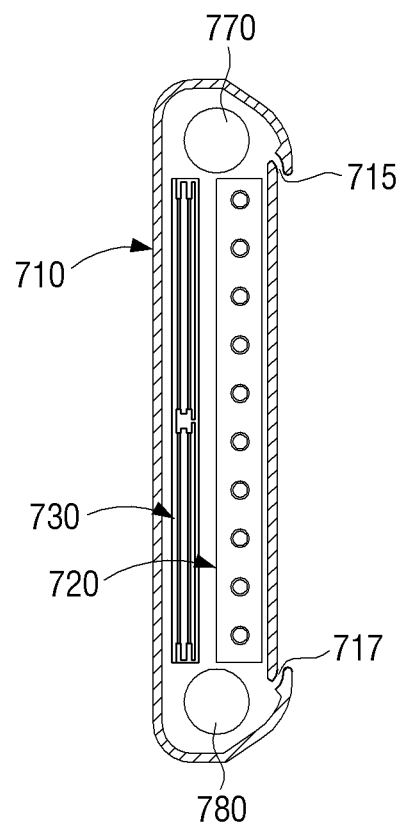
FIG. 16 is a cross-sectional view taken along line E-E of FIG. 15.

FIG. 15 is a perspective view illustrating a full front blowing type air conditioner 700 according to another exemplary embodiment of the present general inventive concept. FIG. 16 is a cross-sectional view taken along line E-E of FIG. 15.

Referring to FIGS. 15 and 16, as in the exemplary embodiment described with reference to FIGS. 10 and 11, the full front blowing type air conditioner 700 according to the present exemplary embodiment includes a case 710 that has a plurality of air outlets 711 formed in a front surface of the case 710, and a heat exchanger 720, a main air blower 730, and upper and lower auxiliary air blowers 770 and 780 that are disposed inside the case 710.

Differently from the exemplary embodiment described with reference to FIGS. 10 and 11, in the present exemplary embodiment, the upper and lower auxiliary air blowers 770 and 780 may be cross flow fans. In this case, upper and lower air outlets 715 and 717 are formed above and under the air outlets 711 of the case 710 to discharge auxiliary air currents in a direction where the auxiliary air currents interfere with a main air current.

Although not shown in FIGS. 15 and 16, the full front blowing type air conditioner 700 according to the present exemplary embodiment may further include left and right auxiliary air blowers that may be cross flow fans. Also, upper, lower, left, and right auxiliary air blowers may be formed of combinations of piezoelectric actuators, VCM actuators, cross flow fans, impeller fans, etc.

Figure 17:
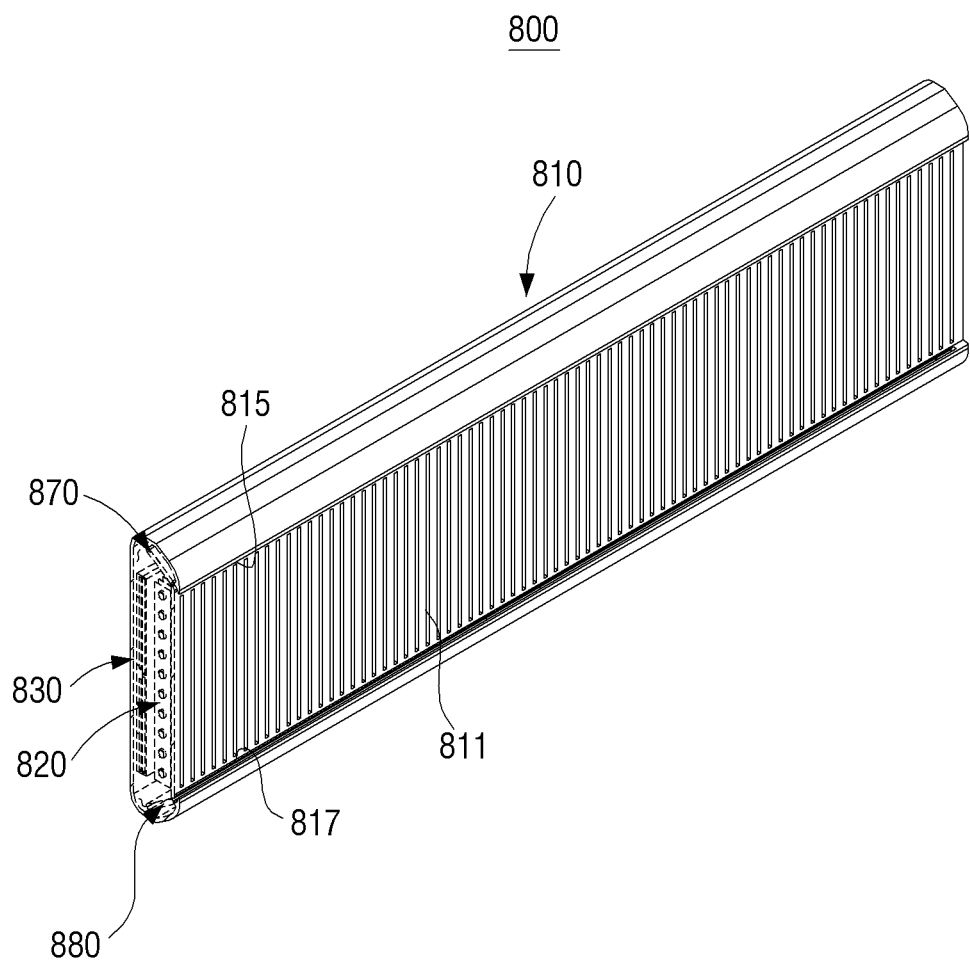
FIG. 17 is a perspective view illustrating an air conditioner according to another exemplary embodiment of the present general inventive concept.
Figure 18:
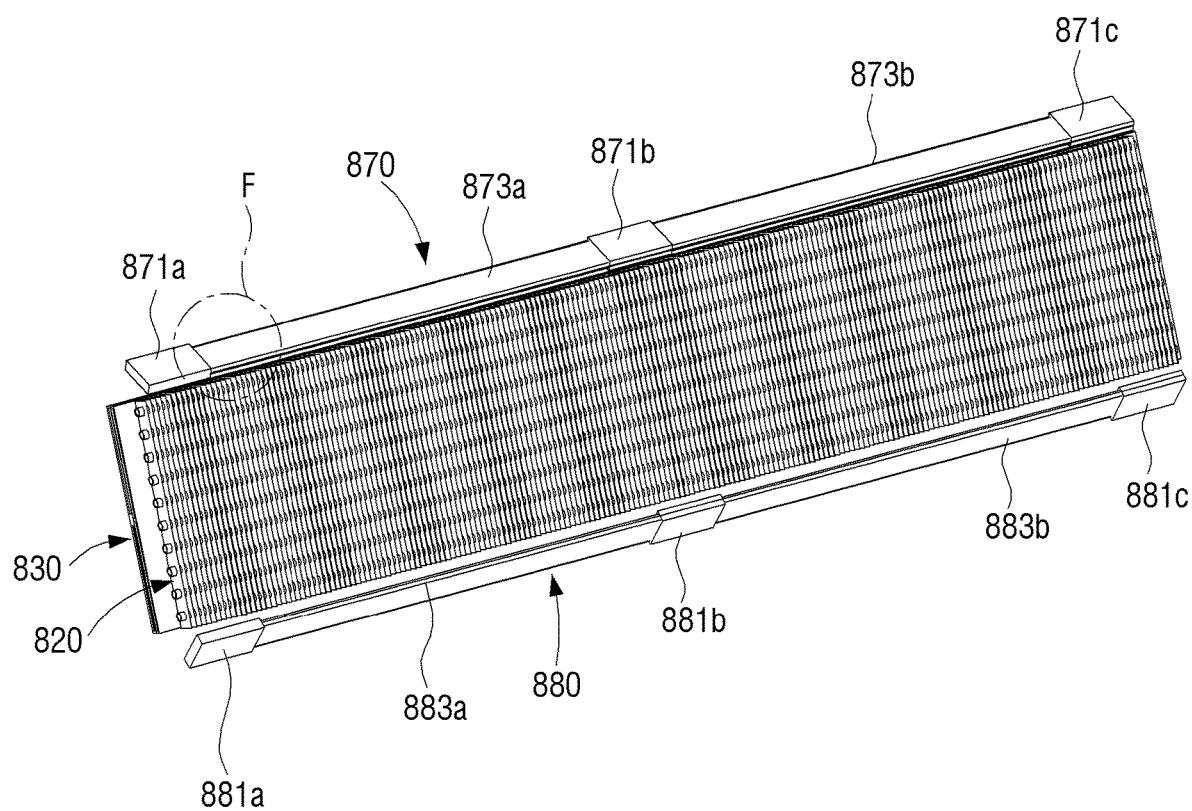
FIG. 18 is a perspective view illustrating the air conditioner of FIG. 17 from which a case is removed.
Figure 19:
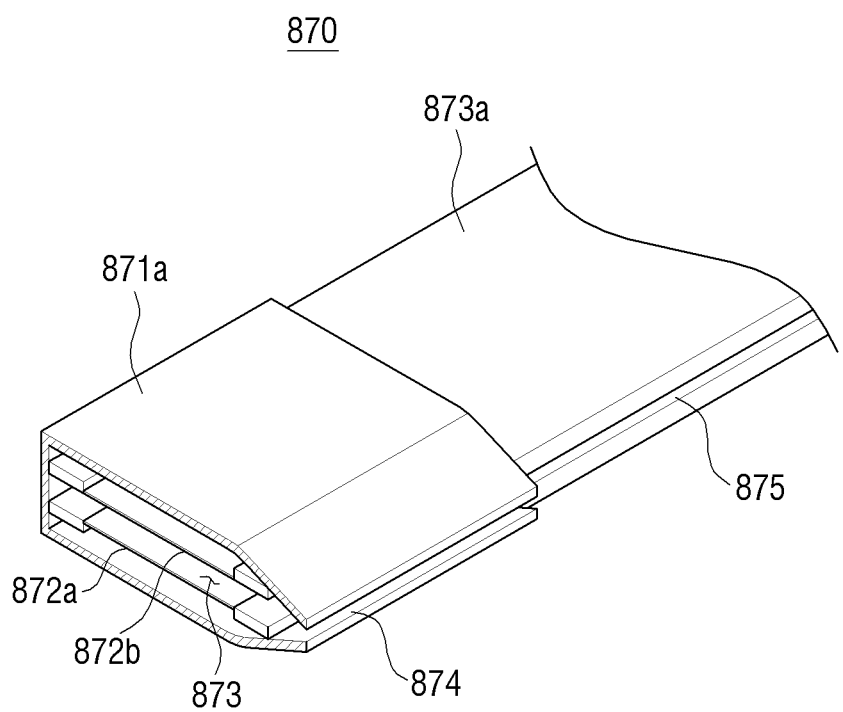
FIG. 19 is an enlarged cross-sectional view illustrating portion F of FIG. 18.

FIG. 17 is a perspective view illustrating a full front blowing type air conditioner 800 according to another exemplary embodiment of the present general inventive concept. FIG. 18 is a perspective view illustrating the full front blowing type air conditioner 800 of FIG. 17 from which a case is removed. FIG. 19 is an enlarged cross-sectional view illustrating portion F of FIG. 18.

Referring to FIGS. 17 and 18, the full front blowing type air conditioner 800 according to the present exemplary embodiment includes a case 810 that has a plurality of air outlets 811 formed in a front surface of the case 810, and a heat exchanger 820, a main air blower 830, and upper and lower auxiliary air blowers 870 and 880 that are disposed inside the case 810.

Referring to FIG. 18, the upper auxiliary air blower 870 includes three adjacent housings 871a, 871b, and 871c and two manifolds 873a and 873b that are disposed between the three adjacent housings 871a, 871b, and 871c. In this case, both ends of each of the manifolds 873a and 873b are connected to the housing 871a, 871b, and 871c that are connected to one another.

Referring to FIG. 19, a pair of piezoelectric diaphragms 872a and 872b are disposed in each of the housings 871a, 871b, and 871c to keep a space.

The pair of piezoelectric diaphragms 872a and 872b are periodically changed into opposite phases to discharge pulse jets through slits 874 of the housings 871a, 871b, and 871c.

Also, some of the pulse jets discharged from the housings 871a, 871b, and 871c flow into the adjacent manifolds 873a and 873b and then are discharged to the upper and lower air outlets 815 and 817 through slits 875 of the manifolds 873a and 873b.

According to the present general inventive concept as described above, a full front blowing type air conditioner may variously and efficiently control an air current. In comparison with an existing wall-mounted air conditioner, the full front blowing type air conditioner may provide a user with a slowly blowing air current to give a pleasant feeling to the user, and mainly cool and heat an inhabited area of an indoor space of the user.

Also, the full front blowing type air conditioner may keep a thickness thereof slim, control a main air current without an additional flap or a mechanical guide, and may be advantageous in terms of design thereof.

In addition, the full front blowing type air conditioner may provide the user with pleasant cooling at a slow flow velocity and may also provide the user with an air current at a fast flow velocity to reach a pleasant state within a short time so as to improve usability. For example, in an initial cooling stage, the full front blowing type air conditioner may operate upper and lower or left and right auxiliary air blowers to accumulate main air currents blowing from a full front of a case in order to generate a fast air current so as to enable the user to feel fast cooling. After a preset time elapses, the full front blowing type air conditioner may operate a main air blower without operating the auxiliary air blowers to send wind so as to realize pleasant cooling without a cold draft caused by the wind.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

INDUSTRIAL APPLICABILITY

The present general inventive concept provides a full front blowing type air conditioner that changes a direction of a main air current, which blows from a full front, through an auxiliary air current.

The invention claimed is:

1. An air conditioner comprising:
   a case having a first air outlet and a second air outlet positioned on a surface of the case;
   a heat exchanger disposed inside the case; and
   at least one air blower disposed inside the case;
   wherein the at least one air blower is configured to generate
      a first pulse air jet that passes through the heat exchanger and thereby changes temperature to form a main air current discharged out of the first air outlet at an angle perpendicular to the surface of the case, and
      a second pulse air jet that passes through the second air outlet without passing through a heat exchanger to form an auxiliary current discharged at an acute angle with respect to the surface of the case, so that the auxiliary air current interferes with and thereby changes the direction of the main air current.

2. The air conditioner of claim 1, further comprising:
   an auxiliary air blower positioned on at least one of a upper side, a lower side, a left side, and a right side of the heat exchanger, and
   the at least one air blower includes a main air blower positioned between the case and the heat exchanger.

3. The air conditioner of claim 1, further comprising:
   a guide path disposed inside the case and configured to guide the second pulse air jet discharged from the at least one air blower as the auxiliary air current; and
   wherein the second air outlet is formed along a longitudinal direction in the surface of the case and is connected to the guide path to discharge the auxiliary air current.

4. The air conditioner of claim 3, wherein the second air outlet is disposed above the heat exchanger, and a lower part of the case is inclined downwards to be more adjacent to a rear part of the case than an upper part of the case.

5. The air conditioner of claim 1, wherein a lower part of the surface of the case is inclined downwards to be more adjacent to a rear part of the case than an upper part of the surface of the case.

6. The air conditioner of claim 1, wherein the at least one blower includes a main air blower comprising:
   a housing including a third air outlet discharging the first pulse air jet toward a front corresponding to the heat exchanger and a fourth air outlet discharging the second pulse air jet to the guide path; and
   at least a pair of piezoelectric diaphragms disposed inside the housing and spaced apart from each other,
   wherein a shape of the at least the pair of piezoelectric diaphragms are periodically changed into opposite phases to change an air pressure of the housing so as to discharge the first pulse air jet and the second pulse air jet through the second air outlet and the fourth air outlet, respectively.

7. The air conditioner of claim 2, wherein the auxiliary air blower comprises:
   a housing including a first slit formed in a side of the housing; and
   at least a pair of piezoelectric diaphragms disposed inside the housing and spaced apart from each other,
   wherein a shape of the at least the pair of piezoelectric diaphragms are periodically changed into opposite phases to discharge the second pulse air jet through the slit.

8. The air conditioner of claim 7, wherein the auxiliary air blower further comprises:
   a pair of housings configured to comprise slits respectively formed in sides of the pair of housings; and
   a manifold disposed between the pair of housings and connected to the pair of housings, and including a second slit formed in a side of the manifold.

9. The air conditioner of claim 2, wherein the auxiliary air blower further comprises a driver configured to set a disposition angle of the auxiliary air blower within a preset angle range to enable the auxiliary air current to interfere with the main air current.

10. The air conditioner of claim 9, wherein the driver is connected to a rear end of the auxiliary air blower and rotates the auxiliary air blower.

11. The air conditioner of claim 1, wherein the at least one blower includes a main air blower and a pair of auxiliary air blowers, and the pair of auxiliary air blowers are respectively disposed above and under the heat exchanger and configured to simultaneously or individually discharge the auxiliary air current.

12. The air conditioner of claim 11, wherein the pair of auxiliary air blowers are respectively disposed on upper, lower, left, and right sides of the heat exchanger and either simultaneously or sequentially discharge auxiliary air currents.

13. The air conditioner of claim 2, wherein the auxiliary air blower is a cross flow fan or an impeller fan.

14. The air conditioner of claim 1, wherein the at least one blower includes a main air blower including:
   a housing including a third air outlet discharging a first pulse air jet toward the heat exchanger; and
   a plurality of piezoelectric diaphragms configured to be disposed inside the housing and spaced apart from each other,
   wherein a shape of the plurality of piezoelectric diaphragms are periodically changed into opposite phases to change an air pressure of the housing so as to discharge the first pulse air jet through an the third air outlet.

15. The air conditioner of claim 14, wherein the plurality of piezoelectric diaphragms are arranged in a matrix.

* * * * *

UNITED STATES PATENT AND TRADEMARK OFFICE
CERTIFICATE OF CORRECTION

| | | |
|---|---|---|
| PATENT NO. | : 10,837,655 B2 | Page 1 of 1 |
| APPLICATION NO. | : 15/506482 | |
| DATED | : November 17, 2020 | |
| INVENTOR(S) | : Ki-hwan Kwon et al. | |

It is certified that error appears in the above-identified patent and that said Letters Patent is hereby corrected as shown below:

In the Claims

Column 14, Line 57 (approx.), In Claim 14, delete "an the" and insert -- the --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*